May 9, 1961    H. A. MASHEDER    2,983,478
BUTTERFLY VALVES
Filed Jan. 13, 1958
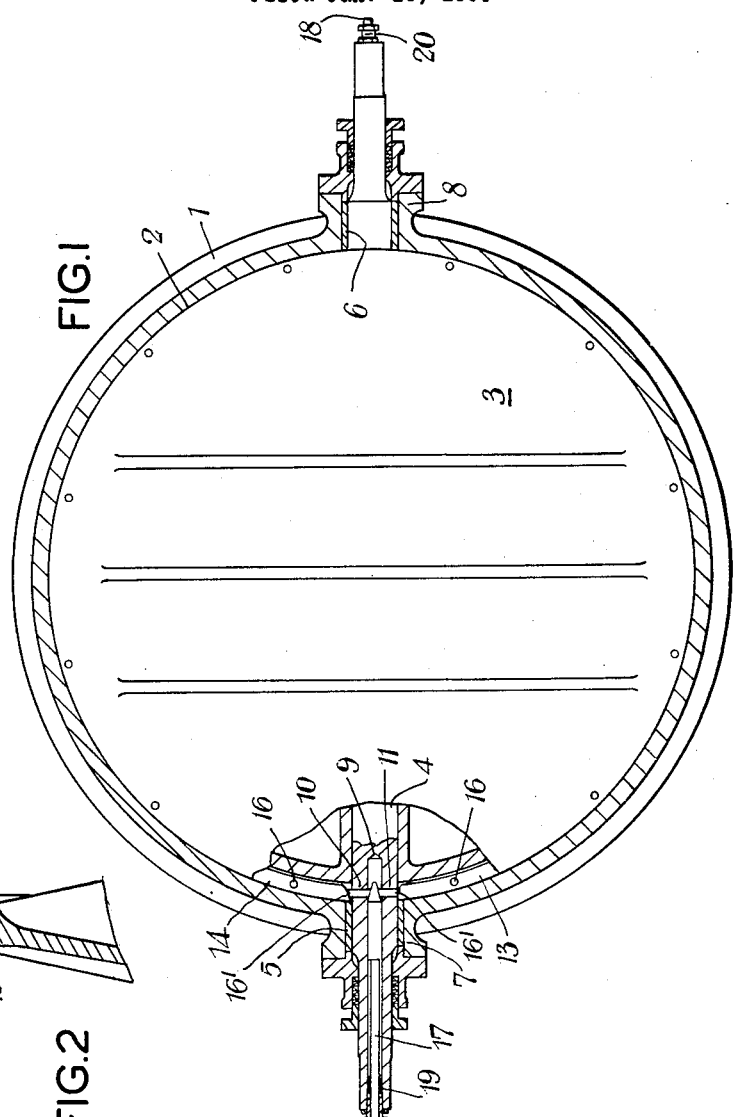
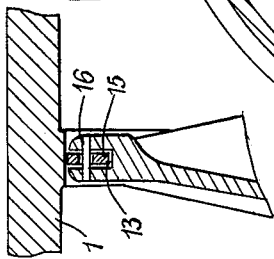
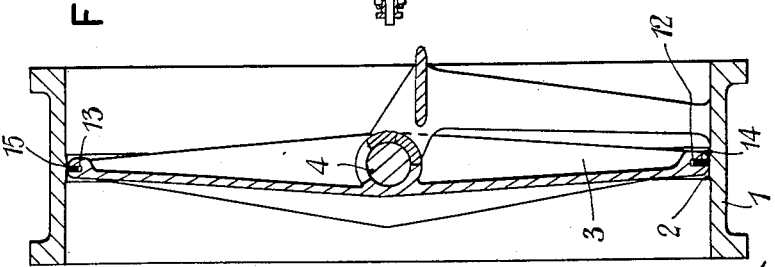
INVENTOR
HENRY A. MASHEDER
BY United States Patent Office 2,983,478
Patented May 9, 1961

2,983,478
BUTTERFLY VALVES

Henry Albert Masheder, Stanmore, England, assignor to James Gordon & Co. Limited, Stanmore, England Filed Jan. 13, 1958, Ser. No. 708,584

Claims priority, application Great Britain Jan. 16, 1957

1 Claim. (Cl. 251—188)

This invention relates to improvements in butterfly valves.

There is an increasing requirement for valves of large size which shall be quickly and easily operable and at the same time substantially leakproof.

Butterfly valves are attractive from the point of view of ease and speed of operation, but they are not inherently capable of providing a good seal when closed.

The invention provides a butterfly valve having its wings circumferentially grooved to receive a pair of substantially semi-circular sealing members or strips and means located within hollow portions of the valve spindle operable upon the adjacent ends of the sealing members to force them apart into sealing contact with the wall of the valve body.

The sealing members should have a good fit in the grooves within which they may be located by pins passing through clearance holes.

The members may take the form of narrow strips of metal, such as stainless steel, or of a suitably tough "plastic." Radial slits may be formed on the inner edge of the strips to facilitate their deforming to fit the valve wall on their being pressed apart.

Radial bores in the valve spindle may give access to the adjacent ends of the pair of strips which may be acted upon by plungers fitted within the bores. Where plungers are employed they may be forced apart mechanically as by a wedge or cam or pneumatically or hydraulically as by forming the plungers as pistons and applying pressure behind them. Whichever method is used the valve spindle should be provided with efficient glands at both ends to prevent leakage of controlled fluid.

The above and other parts of the invention are embodied in one preferred form of butterfly valve which will now be described in greater detail by way of example with reference to the accompanying drawings in which:

Fig. 1 is an end view in part section of a valve and its casing.

Fig. 2 is a central vertical section through the valve and casing of Fig. 1.

Fig. 3 is a fragmentary enlarged view of the upper portion of Fig. 2, illustrating the pin connecting the sealing strip to the valve.

A butterfly valve several feet in diameter operates in a cylindrical body 1 which provides an inwardly facing circumferential seat 2.

The valve 3 is carried on a spindle 4 working in substantial bearings 5 and 6 carried in housings cast in opposite side walls of the body.

The spindle 3 is extended outwardly beyond the bearing housings and passes through gland boxes 7 and 8 bolted to the outer faces of the housings.

The extended ends of the spindle are axially bored to points lying well within the circumference of the valve as at 9.

The spindle 4 is also cross bored on a diameter at points just within the circumference of the valve to provide at these points pairs of radial bores such as 10 and 11 lying in the plane of the wings of the valve and opening into the axial bores.

The valve 3 itself is of sturdy ribbed construction and is keyed to the spindle 4. Its circumferential edge is rounded and is provided with deep and narrow parallel sided grooves 12, 13 in both of its wings. The grooves extend up to the spindle opposite the radial bores therein.

Substantially semi-circular narrow sealing strips 14, 15 of stainless steel are closely fitted into each of the grooves 12, 13, respectively, and these strips are held in position by means of a regularly spaced number of pins 16 passing through generous clearance holes in the strips.

The outer circumferential edges of the sealing strips 14, 15 normally lie in approximate alignment with the circumferential edges of the valve wings as shown in Fig. 2.

A series of narrow slits (not shown) may be provided along selected portions of the inner circumferential edges of the strips to facilitate their adoption of truly arcuate form under force applied to their ends, which may be slightly sloped from outside to inside.

A short rod or plunger 16' is fitted within each of the radial bores in the spindle 4 and these rods have their inner ends cut off at an angle to their axes.

The inner ends of each pair of plungers 16' bear against the surface of the conical ends of a pair of operating rods 17, 18 which are passed through sealing glands 19, 20 at the extremity of each extended end of the valve spindle.

The outer ends of the plungers 16' contact the ends of the sealings strips 14, 15 and the arrangement is such that an endwise movement of the operating rods 17, 18 forces the plungers against the adjacent ends of the sealing strips and expands them to extend radially outwards from the grooves 12, 13 in which they are fitted.

When the valve is in use in the open position the sealing strips are normally housed within the grooves 12, 13, but when the valve is shifted to the closed position, the operating rods 17, 18 are moved to wedge the plungers outwardly and the sealing strips are expanded to make firm contact with the circumferential seat 2 on the valve body.

The shifting of the operating rods may be performed mechanically or by hand or by pneumatic, hydraulic or electric mechanism. The operation of the plungers, however achieved, may of course be interlocked with the valve movement to ensure that the sealing strips are expanded only when necessary.

It will be understood that the invention is not restricted to the details of the specific embodiment described which may be varied without departing from the scope of the following claim.

I claim:

A butterfly valve comprising a cylindrical valve housing having a flow passage therethrough, a circular and uninterrupted valve seat within said housing, a shaft extending diametrically through said housing and supported by the walls thereof, a circular valve mounted on said shaft and movable angularly about the shaft axis from a closed position normal to the path of flow to an open position parallel to the path of flow, a circumferential groove in the outer periphery of said valve, said groove being diametrically interrupted by said shaft, a pair of semicircular sealing strips loosely seated in said groove with the ends of said strips closely adjacent opposite sides of said shaft, an operating rod mounted for axial movement in one end of said shaft, the inner end of said rod having a tapered portion disposed within said shaft and in alignment with a circle partially defined by said sealing strips, cam elements slidably mounted for radial movement in said shaft and in contact with said rod tapered portion and the ends of said sealing strips so that movement of said rod in one direction urges said elements outwardly to force said strips outwardly into sealing engagement with said valve seat, a plurality of spaced openings being provided through said strips, and pins of substantially smaller diameter than said openings passing therethrough and mounted in said valve so that the sealing strips are mounted to the valve and have limited radial movement.

References Cited in the file of this patent

UNITED STATES PATENTS

| 793,281 | Davis | June 27, 1905 |
| 951,908 | Gilmore | Mar. 15, 1910 |
| 2,372,869 | Wheatley | Apr. 3, 1945 |

FOREIGN PATENTS

| 76,173 | Denmark | of 1953 |